United States Patent
Gouillou et al.

(10) Patent No.: US 11,448,520 B2
(45) Date of Patent: Sep. 20, 2022

(54) DEVICE AND METHOD FOR DESENSITIZING A DISPLAY SYSTEM TO FAULTS

(71) Applicant: Airbus Operations S.A.S., Toulouse (FR)

(72) Inventors: Jerome Gouillou, Colomiers (FR); Aymeric Perrin, Blagnac (FR)

(73) Assignee: Airbus Operations S.A.S.

( * ) Notice: Subject to any disclaimer, the term of this patent is extended or adjusted under 35 U.S.C. 154(b) by 695 days.

(21) Appl. No.: 16/414,067

(22) Filed: May 16, 2019

(65) Prior Publication Data

US 2019/0368891 A1 Dec. 5, 2019

(30) Foreign Application Priority Data

May 30, 2018 (FR) ...................................... 18 54623

(51) Int. Cl.
  *G01C 23/00* (2006.01)
  *B64D 43/00* (2006.01)
  *G06T 11/20* (2006.01)

(52) U.S. Cl.
  CPC ............. *G01C 23/00* (2013.01); *B64D 43/00* (2013.01); *G06T 11/203* (2013.01); *G06T 2200/24* (2013.01)

(58) Field of Classification Search
  CPC ....... G01C 23/00; B64D 43/00; G06T 11/203; G06T 2200/24
  See application file for complete search history.

(56) References Cited

U.S. PATENT DOCUMENTS

| 5,296,854 A | * | 3/1994 | Hamilton | ............... | G09B 9/302 345/9 |
| 5,343,395 A | * | 8/1994 | Watts | ................... | G05D 1/0676 701/538 |
| 5,798,713 A | * | 8/1998 | Viebahn | ............... | G01C 23/005 340/975 |
| 6,014,117 A | * | 1/2000 | Hennessy | ............. | G02B 27/017 345/9 |
| 6,085,150 A | * | 7/2000 | Henry | .................. | G08G 5/0078 340/961 |

(Continued)

FOREIGN PATENT DOCUMENTS

| EP | 2413101 A1 | 2/2012 |
| FR | 3053818 A1 | 1/2018 |
| FR | 3058233 A1 | 5/2018 |

*Primary Examiner* — Hussein Elchanti
(74) *Attorney, Agent, or Firm* — Lerner, David, Littenberg, Krumholz & Mentlik, LLP

(57) ABSTRACT

A desensitization device includes an acquisition module for acquiring the current flight parameters of the aircraft, a generation module for generating a first image depicting flight symbology including at least one reference zero pitch line, a generation module for generating a second image depicting topography of terrain overflown by the aircraft, a generation module for generating a third image including at least two portions separated by a separating line, a generation module configured to generate a fourth image by superposing the first image, the second image and the third image in that order, the first image being placed in the foreground, and a transmission module configured to transmit, to a user device, a signal that is representative of the fourth image.

15 Claims, 9 Drawing Sheets

(56) References Cited

U.S. PATENT DOCUMENTS

| | | | | |
|---|---|---|---|---|
| 6,157,876 A * | 12/2000 | Tarleton, Jr. | | G05D 1/0676 342/63 |
| 6,405,107 B1 * | 6/2002 | Derman | | G01C 23/005 340/948 |
| 6,486,799 B1 * | 11/2002 | Still | | G01C 23/005 340/978 |
| 6,529,820 B2 | 3/2003 | Tomescu | | G08G 5/0082 342/36 |
| 6,583,733 B2 * | 6/2003 | Ishihara | | B64D 45/04 701/9 |
| 6,678,588 B2 * | 1/2004 | He | | G06T 17/05 701/3 |
| 6,690,299 B1 * | 2/2004 | Suiter | | G01C 23/005 340/975 |
| 6,879,886 B2 * | 4/2005 | Wilkins, Jr. | | G01C 23/005 342/63 |
| 7,091,881 B2 * | 8/2006 | Judge | | G05D 1/102 340/967 |
| 7,106,217 B2 * | 9/2006 | Judge | | H04L 67/125 701/14 |
| 7,167,782 B2 * | 1/2007 | Humbard | | G01C 23/00 340/961 |
| 7,286,062 B2 * | 10/2007 | Feyereisen | | G01C 23/00 340/961 |
| 7,298,291 B2 * | 11/2007 | von Thal | | B64D 39/00 340/953 |
| 7,365,652 B2 * | 4/2008 | Scherbarth | | G05D 1/0676 701/16 |
| 7,589,645 B2 * | 9/2009 | Schmidt | | B64C 25/001 340/960 |
| 7,642,929 B1 * | 1/2010 | Pinkus | | G01C 23/00 345/646 |
| 7,724,155 B1 | 5/2010 | Anderson et al. | | |
| 7,747,364 B2 * | 6/2010 | Roy | | G05D 1/0044 701/28 |
| 7,804,981 B2 * | 9/2010 | Viggiano | | G08G 5/0026 382/104 |
| 2003/0132860 A1 * | 7/2003 | Feyereisen | | G01C 23/00 340/963 |
| 2010/0023189 A1 * | 1/2010 | Suddreth | | G01C 23/00 701/16 |
| 2014/0267422 A1 | 9/2014 | Feyereisen et al. | | |
| 2016/0273919 A1 * | 9/2016 | Miller | | G01C 21/16 |
| 2018/0010922 A1 | 1/2018 | Monvoisin et al. | | |
| 2018/0122331 A1 | 5/2018 | Perrin et al. | | |
| 2021/0359515 A1 * | 11/2021 | Betak | | G05B 9/02 |

* cited by examiner

DEVICE AND METHOD FOR DESENSITIZING A DISPLAY SYSTEM TO FAULTS

FIELD OF THE INVENTION

The present invention relates to a device and a method for desensitizing a display system, in particular a primary flight display configured to display synthetic topography as a background image for flight and navigation symbology, to faults.

BACKGROUND OF THE INVENTION

A primary flight display (PFD) generally displays an image depicting flight and navigation symbology that is generated by a control and display system (CDS) or else by an electronic instrument system (EIS). In parallel, a synthetic vision system (SVS) generates an image depicting topology of the terrain overflown by the aircraft. This last image is placed in the background of the image depicting the flight and navigation symbology. This display may also be provided on a display surface such as a head-up display (HUD). This surface corresponds to a transparent surface located in the exterior field of view of the pilot on which flight information is displayed.

This display enhances the situational awareness of the pilot regarding the geographic position of the aircraft, the position of the aircraft with respect to the terrain over which it is flown and the relative position of the aircraft with respect to an approach trajectory with a view to landing.

However, this display could be subject to faults if, for example, the pitch data or the altitude data were corrupted (altered) during processing by the SVS. These faults could result in the topology of the overflown terrain in the display being shifted downwards or upwards.

BRIEF SUMMARY OF THE INVENTION

Aspects of the present invention may overcome these drawbacks by providing a fault desensitization method and device while limiting the load on the pilot if a shift in the topology occurs.

The invention relates to a method for desensitizing an aircraft display system, configured to display a synthetic representation of terrain, to faults.

According to an aspect of the invention, the desensitization method comprises the following steps:

an acquisition step, implemented by an acquisition module, consisting in acquiring environment data and current flight parameters of the aircraft, including at least an attitude, an altitude, a three-dimensional position and a heading;

a first generation step, implemented by a first generation module, consisting in generating a first image depicting flight symbology comprising at least one reference zero pitch line, the first image indicating a pitch angle with respect to a zero pitch angle of the aircraft, the reference zero pitch line being representative of the zero pitch angle of the aircraft, the first image being generated on the basis of at least the attitude;

a second generation step, implemented by a second generation module, consisting in generating a second image depicting topography of terrain overflown by the aircraft on the basis of at least the attitude, the heading, the three-dimensional position and the environment data;

a third generation step, implemented by a third generation module, consisting in generating a third image comprising at least two portions separated by a separating line that is determined on the basis of the attitude of the aircraft, a first portion including pixels having a value that is representative of a first colour range, a second portion including pixels having a value that is representative of a second colour range;

a fourth generation step, implemented by a fourth generation module, consisting in generating a fourth image by superposing the first image, the second image and the third image in that order, the first image being placed in the foreground such that, when the topography of the overflown terrain shown in the second image is shifted downwards because of a fault, the second portion of the third image is visible in the fourth image, thus highlighting said fault;

a transmission step, implemented by a transmission module, consisting in transmitting, to a user device, a signal that is representative of the fourth image.

Thus, by virtue of the third image generated by the third generation module, a fault may be highlighted by the second portion of the third image appearing on the display when the topography of the overflown terrain is shifted downwards.

According to one particularity, the second generation step comprises the following substeps:

a first determination substep, implemented by a first determination submodule, consisting in determining the topography of the terrain overflown by the aircraft on the basis of at least the attitude, the three-dimensional position, the heading and the environment data;

a first attribution substep, implemented by a first attribution submodule, consisting in attributing at least one pixel value to a first set of pixels forming part of the second image, the one or more pixel values being representative of the topography of the terrain overflown by the aircraft;

a second attribution substep, implemented by a second attribution submodule, consisting in attributing a value that is representative of a transparent pixel to a second set of pixels forming part of the second image, the second set of pixels corresponding to a set of the second image, the pixels of which do not belong to the first set of pixels.

According to another particularity, the third generation step comprises the following substeps:

a second determination substep, implemented by a second determination submodule, consisting in determining a position of the separating line on the basis of the reference zero pitch line, the separating line being parallel to the reference zero pitch line, the second portion of the third image being at least partly in correspondence with the topography of the terrain overflown by the aircraft represented in the second image when the first image, the second image and the third image are superposed in the fourth generation step;

an addition substep, implemented by an addition module, consisting in adding an indicative element that is indicative of an error to the second portion of the third image so as to signal said fault explicitly, this indicative element being visible in the fourth image when the topography of the overflown terrain shown in the second image is shifted downwards because of the fault.

According to a first embodiment, the separating line is arranged in a position corresponding to a zero pitch angle of the aircraft;

and the indicative element is arranged at a distance corresponding to a pitch angle with respect to the separating line corresponding to an angle that is defined by the difference between the zero pitch angle of the aircraft and a natural horizon line when the aircraft is flown at a maximum altitude.

According to a second embodiment, the separating line is arranged at a pitch angle, with respect to a zero pitch angle position of the aircraft, that is equal to the difference between the zero pitch angle of the aircraft and a natural horizon line when the aircraft is flown at a maximum altitude.

According to a third embodiment, the separating line is arranged at a pitch angle, with respect to a zero pitch position of the aircraft, which is dependent on the altitude of the aircraft.

According to a fourth embodiment, the thickness of the separating line is equal to a pitch angle that is defined by the difference between a zero pitch angle of the aircraft and a natural horizon line when the aircraft is flown at a maximum altitude, the separating line comprising pixels exhibiting a gradient of values along the thickness between a value equal to a value that is representative of the first colour range for a first row of pixels that are adjacent to the first portion of the third image and a value equal to a value that is representative of the second colour range for a second row of pixels that are adjacent to the second portion of the third image, the first row of pixels being arranged in a position corresponding to the zero pitch angle of the aircraft.

According to a fifth embodiment, the separating line is arranged at a pitch angle, with respect to a zero pitch angle position of the aircraft, that is equal to the difference between the zero pitch angle of the aircraft and a horizon line, the horizon line being determined on the basis of a predetermined distance defined by a maximum field of view of the topography of the terrain represented in the second image, when the aircraft is flown at a maximum altitude.

According to a sixth embodiment, the separating line is arranged at a pitch angle, with respect to a zero pitch position of the aircraft, that is dependent on the altitude of the aircraft and on a predetermined distance defined by a maximum field of view of the topography of the terrain represented in the second image.

According to a seventh embodiment, the thickness of the separating line is equal to a pitch angle that is defined by the difference between a natural horizon line and a horizon line that is dependent on a predetermined distance defined by a maximum field of view of the topography of the terrain represented in the second image, the separating line including pixels exhibiting a value that is representative of a third colour range, the separating line being arranged at a pitch angle, with respect to a zero pitch position of the aircraft, that is equal to the difference between the zero pitch angle and the natural horizon line.

According to an eighth embodiment, the separating line is arranged at a pitch angle, with respect to a zero pitch position of the aircraft, that is dependent on the altitude of the aircraft less an altitude of the terrain overflown by the aircraft and on a predetermined distance defined by a maximum field of view of the topography of the terrain represented in the second image.

Furthermore, if the aircraft finds itself in one of the following situations:
on final approach in a landing phase;
in a takeoff phase;
in a go-around phase;
then the altitude of the overflown terrain is equal to a current altitude of the overflown terrain in one of the preceding situations,
otherwise the altitude of the overflown terrain is assumed to be zero.

According to a ninth and a tenth embodiment, the altitude of overflown terrain is equal to a minimum altitude of the terrain overflown by the aircraft within a cylinder segment, the cylinder being centred on the aircraft, the radius of the cylinder segment being equal to the predetermined distance and having an aperture angle of the maximum field of view.

The invention also relates to a device for desensitizing an aircraft display system, configured to display a synthetic representation of terrain, to faults.

According to an embodiment of the invention, the device comprises the following modules:

an acquisition module configured to acquire environment data and current flight parameters of the aircraft, including at least an attitude, an altitude, a three-dimensional position and a heading;

a first generation module configured to generate a first image depicting flight symbology comprising at least one reference zero pitch line, the first image indicating a pitch angle with respect to a zero pitch angle of the aircraft, the reference zero pitch line being representative of the zero pitch angle of the aircraft, the first image being generated on the basis of at least the attitude and the altitude;

a second generation module configured to generate a second image depicting topography of terrain overflown by the aircraft on the basis of at least the attitude, the heading, the three-dimensional position and the environment data;

a third generation module configured to generate a third image comprising at least two portions separated by a separating line that is determined on the basis of the attitude of the aircraft, a first portion including pixels having a value that is representative of a first colour range, a second portion including pixels having a value that is representative of a second colour range;

a fourth generation module configured to generate a fourth image by superposing the first image, the second image and the third image in that order, the first image being placed in the foreground such that, when the topography of the overflown terrain shown in the second image is shifted downwards because of a fault, the second portion of the third image is visible in the fourth image, thus highlighting said fault;

a transmission module configured to transmit, to a user device, a signal that is representative of the fourth image.

The invention also relates to an aircraft, in particular a transport plane, which includes a fault desensitization device such as specified above.

BRIEF DESCRIPTION OF THE FIGURES

The invention, with its features and advantages, will become more clearly apparent upon reading the description provided with reference to the appended drawings, in which.

DETAILED DESCRIPTION

Figure 2:
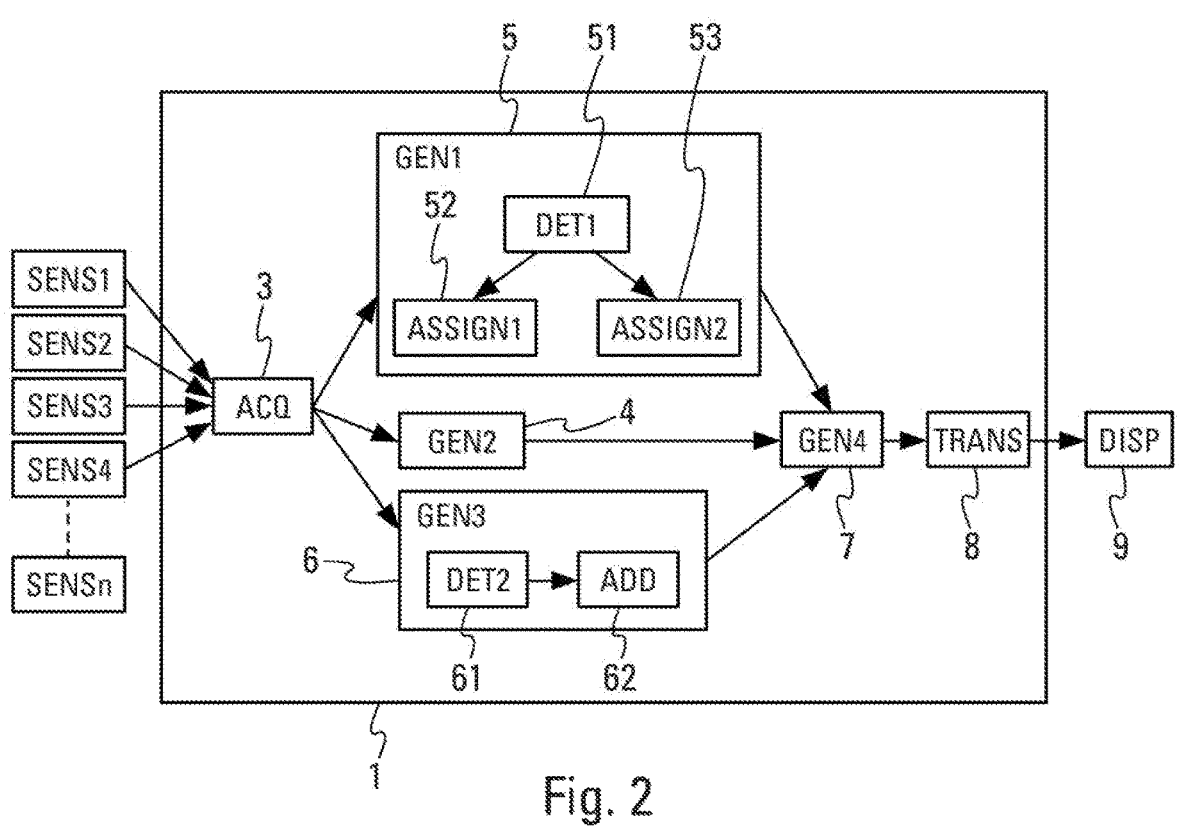
FIG. 2 schematically shows one embodiment of the fault desensitization method.

FIG. 2 shows one embodiment of the device 1 for desensitizing a display system (DISP) 9 of an aircraft AC to faults. Throughout the rest of description, the device 1 for desensitizing a display system to faults will be referred to as the desensitization device.

The display system 9 is configured to display a synthetic representation of terrain. The display system 9 may correspond to a primary flight display PFD or a head-up display HUD surface.

The desensitization device 1, on board the aircraft AC, comprises an acquisition module ACQ (also known as a "module for acquiring") 3 that is configured to acquire current flight parameters of the aircraft AC and environment data.

The acquisition module 3 acquires the flight parameters measured by the sensors SENS1, SENS2, SENS3, SENS4, . . . , SENSn 2. The acquisition module 3 acquires at least one current attitude of the aircraft AC, a current altitude of the aircraft, a current three-dimensional position of the aircraft, a current heading of the aircraft AC and current environment data. The environment data correspond, for example, to data relating to the overflown terrain, data relating to one or more runways or data relating to obstacles that are liable to be encountered by the aircraft AC.

The desensitization device 1 also comprises a generation module 4 GEN2 (also known as a "module for generating") that is configured to generate an image I1 depicting flight symbology. The flight symbology comprises at least one reference zero pitch line 10. This second image I1 indicates a pitch angle with respect to a zero pitch angle of the aircraft AC. The reference zero pitch line 10 is representative of the zero pitch angle of the aircraft AC. Thus, a distance between a horizon line and the reference zero pitch line 10 is representative of a pitch angle with respect to the zero pitch angle of the aircraft AC. The image I1 is generated on the basis of the current flight parameters, which correspond at least to the current attitude of the aircraft AC. The image I1 comprises a set of pixels. The pixels that are representative of the symbology have values that are representative of colours displayed in the image I1. The other pixels of the set of pixels have a value that is representative of a transparent (colourless) pixel. The generation module 4 may be included within a CDS/EIS.

The desensitization device 1 further comprises a generation module GEN1 5 that is configured to generate an image I2 depicting topography of terrain 15 overflown by the aircraft AC. The topography is generated on the basis of current flight parameters, which correspond at least to the attitude of the aircraft AC, the heading of the aircraft AC, the three-dimensional position of the aircraft AC and environment data. The environment data allow the various elements included within the topography of the overflown terrain 15 to be known. The attitude, the heading and the three-dimensional position allow the topography determined on the basis of the environment data to be shown from the point of view of the pilot. The image I2 therefore depicts the topography of the overflown terrain with the sky. The topography of the overflown terrain and the sky are separated by the horizon 18.

For example, for a primary flight display PFD, the sky is represented by a set of blue colours and the topography of the terrain is represented by a set of green, brown and/or white colours.

For example, for a head-up display HUD surface, the sky is transparent and the topography of the terrain is monochromatic. The topography of the terrain may be green in colour.

Thus, when the image I1 is superposed over the image I2, the topography is shown in the background with respect to the symbology.

The desensitization device 1 also comprises a generation module GEN3 6 that is configured to generate an image I3 comprising at least two portions separated by a separating line 11 that is determined from the attitude of the aircraft AC, in particular from a roll angle and from a pitch angle of the aircraft AC. A portion 13 includes pixels having a value that is representative of a first colour range and a portion 14 includes pixels having a value that is representative of a second colour range.

A colour range may correspond to a single colour or to a set of colours.

For example, for a primary flight display PFD, the first colour range corresponds to a blue colour so that the colour of the portion 13 is close to the colour of the sky. The second colour range corresponds to a brown colour so that the colour of the portion 14 is close to the colour of the topography of the terrain.

According to another example, for a primary flight display PFD, the first colour range corresponds to a set of colours representing a sky, such as a gradient of blues. The second colour range corresponds to a set of colours representing the topography of the terrain, such as a set of brown colours.

According to one example, for the head-up display surface, the second colour range corresponds to a set of green colours.

Figure 3:
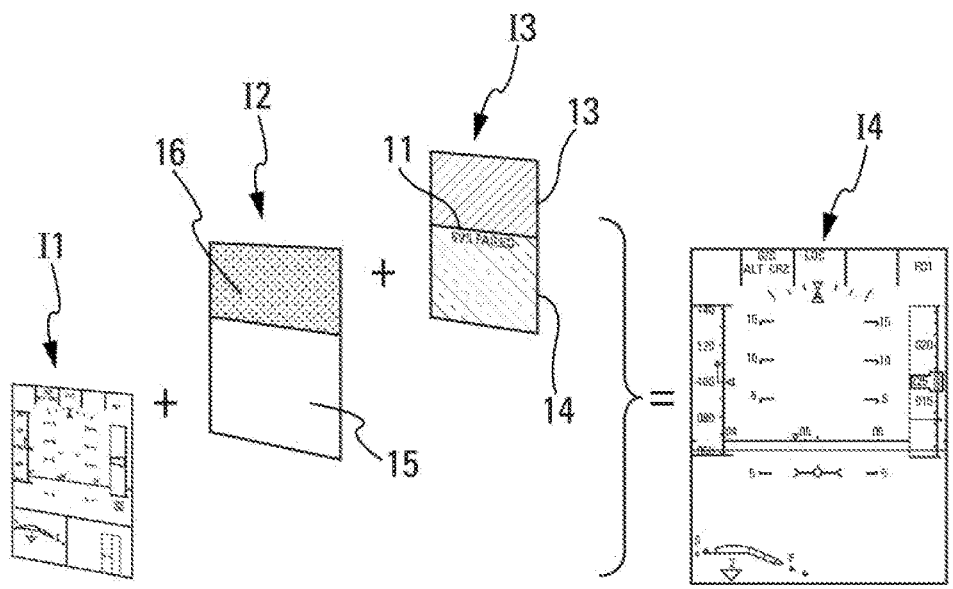
FIG. 3 shows an image displayed on a display device after superposition of the first, second and third images.

A generation module GEN4 7, forming part of the desensitization device 1, is configured to generate an image I4 by superposing the image I1, the image I2 and the image I3 in that order (FIG. 3). The image I1 is placed in the foreground. Advantageously, the images I1, I2, I3 and I4 have the same pixel dimensions so that they are directly superposable.

A transmission module TRANS (also known as a "module for transmitting") 8, forming part of the desensitization device 1, is configured to transmit, to a user device 9 such as the display system, a signal that is representative of the image I4.

Advantageously, the generation module 5 comprises a determination submodule DET1 (also known as a "module for determining") 51 that is configured to determine the topography of the terrain overflown by the aircraft AC on the basis of at least the attitude, the three-dimensional position, the heading and the environment data.

An attribution submodule ASSIGN1 (also known as a "module for assigning") 52, which forms part of the generation module 5, is configured to attribute at least one pixel value to a set of pixels forming part of the image I2 (FIG. 3). The one or more pixel values attributed to the set of pixels are representative of the topography of the terrain 15 overflown by the aircraft AC. The first colour range of the portion 13 of the image I3 corresponds to one or more colours that are close to the one or more colours of the topography of the image I2.

An attribution submodule ASSIGN2 53, which forms part of the desensitization device 1, is configured to attribute a value that is representative of a transparent pixel to a set of pixels 16 forming part of the image I2. The set of pixels 16 corresponds to a set from the image I2, the pixels of which do not belong to the set of pixels 15.

Thus, by virtue of the transparency of these pixels of the set of pixels 16, the image I3 may appear in the background with respect to the superposed images I1 and I2. Only the portion of the image I3 that is in correspondence with the set of pixels 16 from the image I2 appear by virtue of the transparency of the pixels of the set of pixels 16. Depending on the size of the set of pixels 16, at least part of the portion 13 and, possibly, the portion 14 appear.

The generation module 6 may comprise a determination submodule DET2 61 that is configured to determine a position of the separating line 11 on the basis of the attitude of the aircraft AC. The separating line 11 is parallel to the reference zero pitch line 10 when all of the images I1, I2 and I3 are superposed. The portion 14 of the image I3 is at least partly in correspondence with the topography of the terrain 15 overflown by the aircraft AC depicted in the second image I2 when the image I1, the image I2 and the image I3 are superposed by the generation module 7.

According to one variant embodiment, the determination submodule 61 may be included within the CDS/EIS.

According to another variant embodiment, the determination submodule 61 may be included within a system other than the CDS and the EIS exhibiting comparable integrity.

An addition module ADD (also known as a "module for adding") 62, forming part of the generation module 6, is configured to add an indicative element 12 that is indicative of an error to the portion 14 of the image I3. The indicative element may correspond to an acronym, a figure, text or any other element representing an error. For example, the indicative element corresponds to text such as "SVS FAILED".

Figure 12:
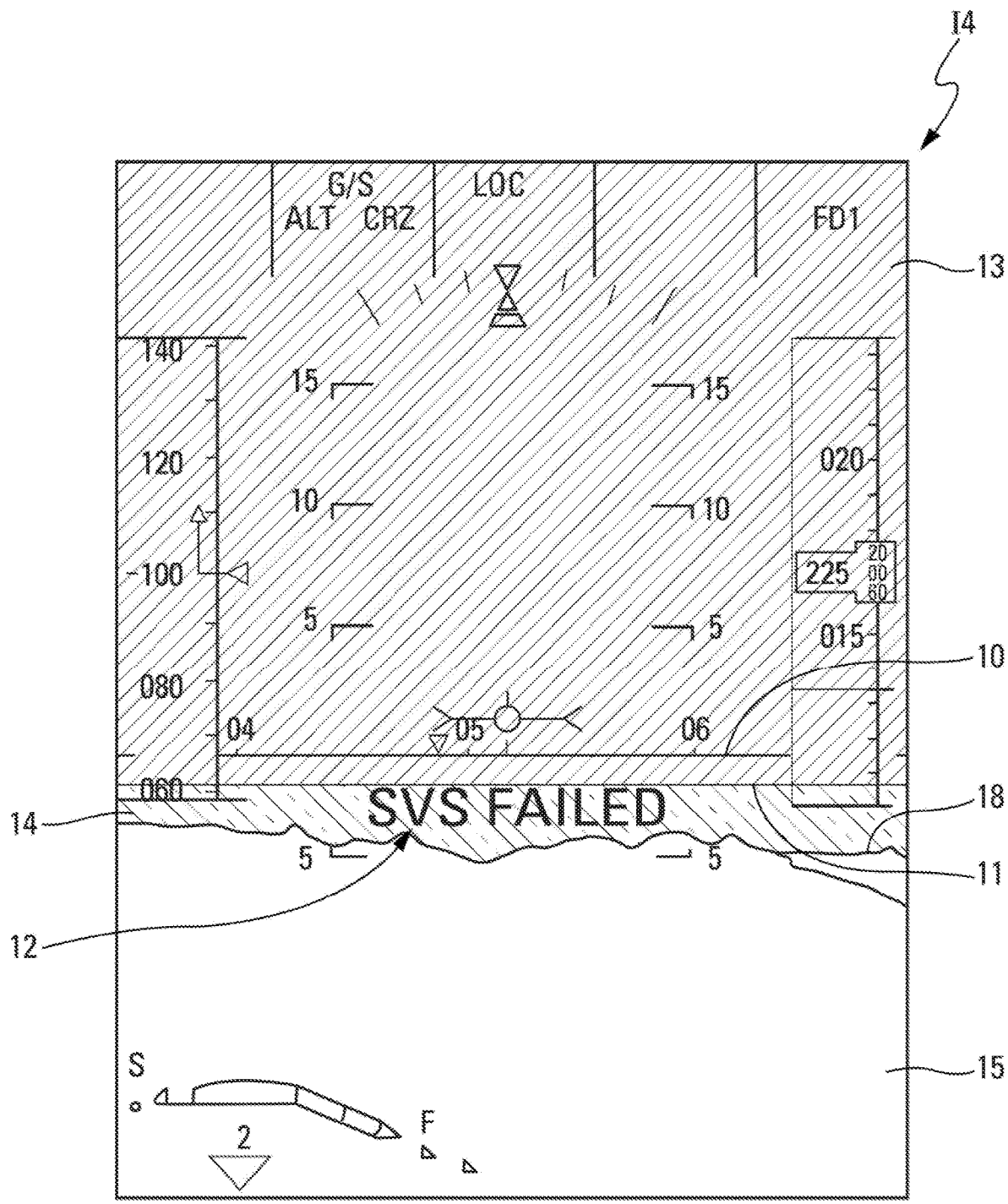
FIG. 12 show a fourth image when a fault occurs.

Thus, when the topology of the overflown terrain 15 on the display is shifted downwards because of corrupted data, the indicative element 12 appears, indicating a fault in the processing of certain data by the generation module 5, such as the pitch and altitude data (FIG. 12). When the topology of the overflown terrain 15 is not shifted, the indicative element 12 is hidden by the topology of the overflown terrain 15 in the image I2.

Figure 4:
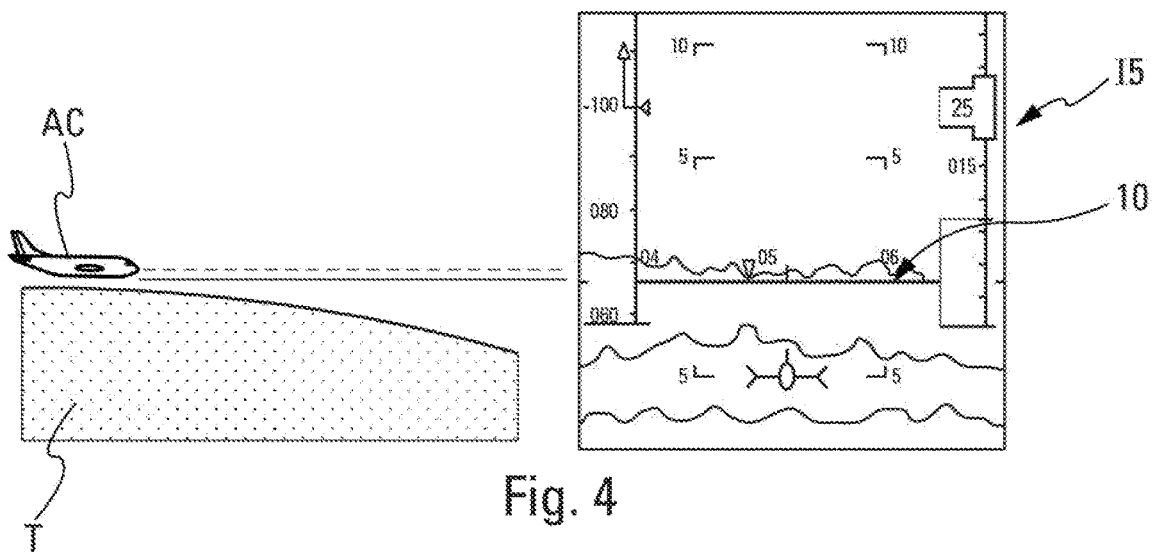
FIG. 4 shows a side view of an aircraft flying at low altitude and a display comprising the first and the second images in superposition.
Figure 5:
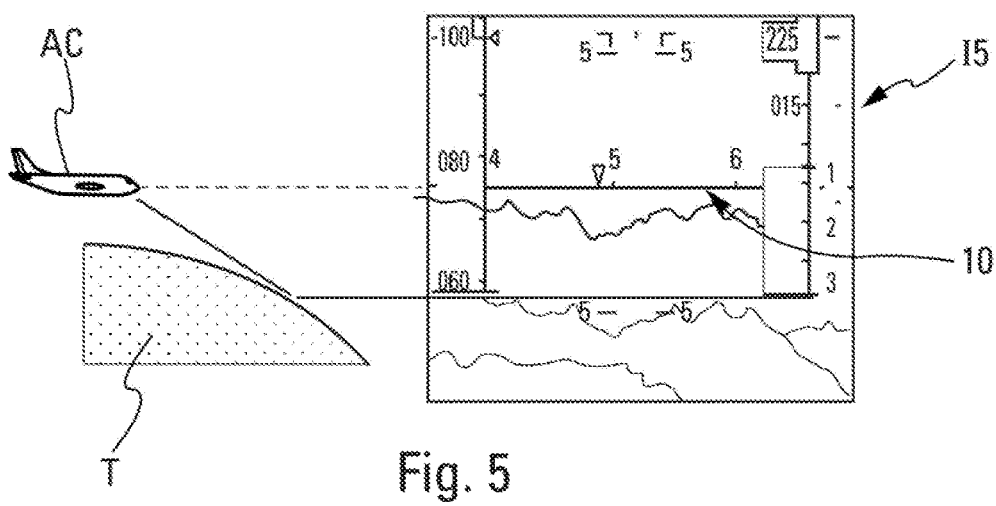
FIG. 5 shows a side view of an aircraft flying at high altitude and a display comprising the first and the second images in superposition.

FIG. 4 shows an aircraft AC flying over terrain at low altitude and an image I5 that is liable to be displayed in a display system not possessing a desensitization device 1 for this aircraft AC. FIG. 5 shows an aircraft AC flying over terrain at high altitude and the image I5 that is liable to be displayed in a display system for this aircraft AC. Due to the curvature of the Earth T, if the separating line 11 is placed in a position corresponding to a zero pitch angle, the indicative element 12 may appear even though there is no fault.

The following four embodiments provide solutions for dealing with the curvature of the Earth T.

Figure 8:
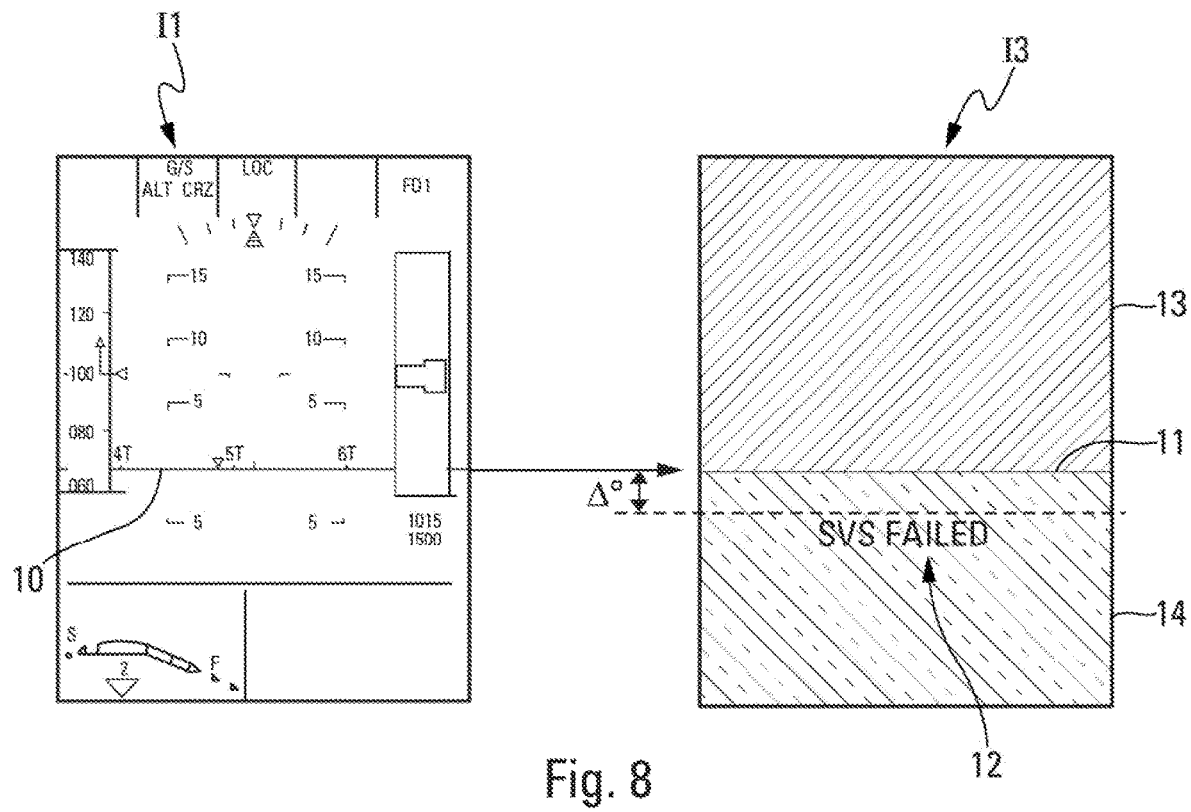
FIG. 8 shows, on the left, a first image showing symbology and, on the right, a third image according to some embodiments.

According to a first embodiment (FIG. 8), the separating line 11 is arranged in a position corresponding to a zero pitch angle of the aircraft AC. However, the indicative element 12 is arranged at a distance corresponding to a pitch angle $\Delta^0$ with respect to the separating line 11 corresponding to an angle that is defined by the difference between the zero pitch angle of the aircraft AC and a natural horizon line when the aircraft AC is flown at a maximum altitude. The natural horizon corresponds to the horizon visible from the aircraft at a given altitude.

For example, the following equation allows the pitch angle $\Delta^0$ to be obtained according to the altitude of the aircraft AC while taking the curvature of the Earth T into account:

$$\Delta^0 = \arctan\left(\frac{0.3048 \times \sqrt{Altitude_{feet}}}{1.23 \times 1852}\right),$$

where $Altitude_{feet}$ is the altitude of the aircraft AC in feet (1 foot is approximately equal to 0.305 m).

Thus, if it is assumed that the maximum altitude of the aircraft AC is 50 000 feet (approximately 15 240 m), the pitch angle $\Delta^0$ is equal to 1.71°. The indicative element 12 is therefore placed at a distance below the separating line 11 corresponding to a pitch angle $\Delta^0$ of 1.71°.

According to a second embodiment, the separating line 11 is arranged at a pitch angle $\Delta^\circ$, with respect to a zero pitch position of the aircraft AC. The pitch angle $\Delta^0$ is equal to the difference between the zero pitch angle of the aircraft (AC) and a natural horizon line when the aircraft (AC) is flown at a maximum altitude of the aircraft AC. Thus, the pitch angle $\Delta^0$ is such that the separating line 11 shown is placed at the position of the natural horizon when the aircraft AC is flown at a maximum altitude. The pitch angle allowing the separating line 11 to be positioned may be determined using the equation described in the first embodiment.

In this embodiment, the indicative element 12 may be "fixed" below the separating line 11. For example, the indicative element 12 may be placed at a distance of between one and five pixels away from the separating line 11.

According to a third embodiment, the separating line 11 is arranged at a pitch angle $\Delta^\circ$, with respect to a zero pitch position of the aircraft AC, which is dependent on the altitude of the aircraft AC.

In this embodiment, the position of the separating line 11 is dynamic and changes with the altitude of the aircraft AC. The equation for determining the position of the separating line may be the same as that described in the first embodiment in which the altitude Altitude$_{feet}$ of the aircraft AC is variable. Other equations may be used. For example, other equations may take the radius of the Earth T or atmospheric diffraction effects into account. The indicative element 12 may be "fixed" below the separating line 11. For example, the indicative element 12 may be placed at a distance of between one and five pixels away from the separating line 11.

Figure 10:
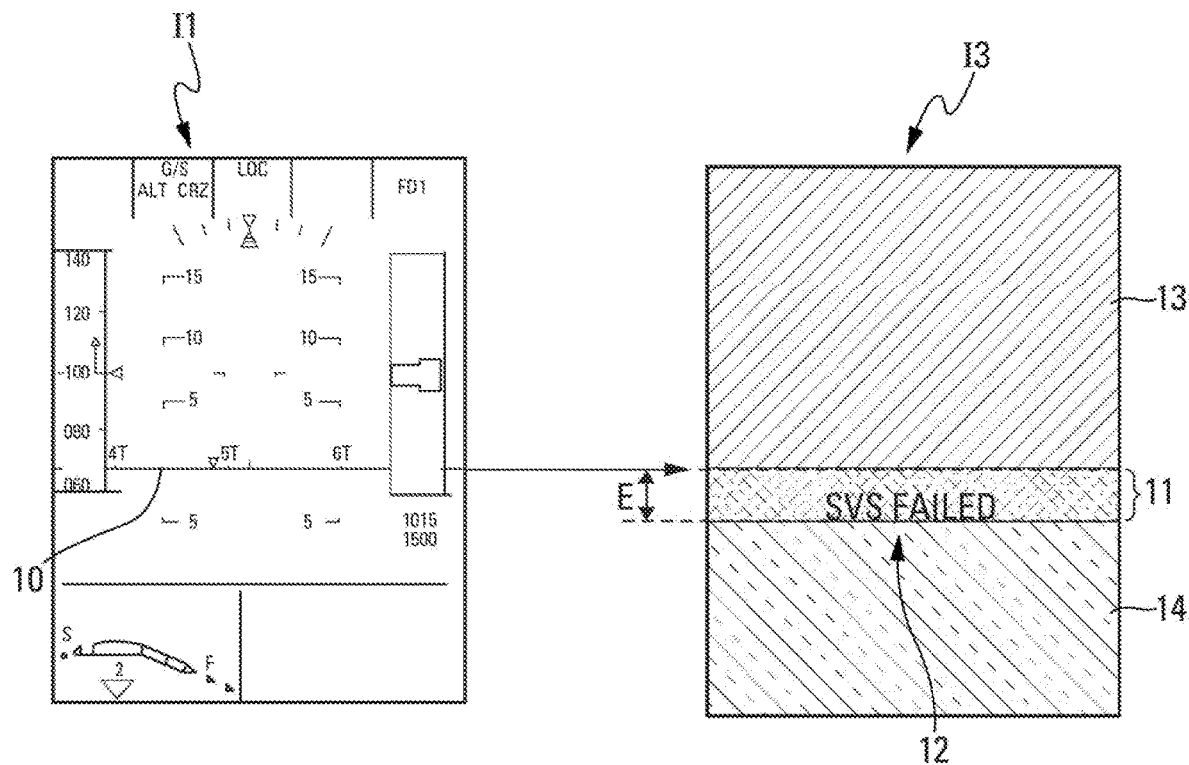
FIG. 10 shows, on the left, a first image showing symbology and, on the right, a third image according to another embodiment.

According to a fourth embodiment (FIG. 10), the thickness E of the separating line 11 is equal to a pitch angle defined by the difference between a zero pitch angle of the aircraft AC and the natural horizon when the aircraft AC is flown at a maximum altitude. The separating line 11 comprises pixels exhibiting a gradient of values along the thickness E between a value equal to a value that is representative of the first colour range for a first row of pixels that are adjacent to the portion 13 of the image I3 and a value equal to a value that is representative of the second colour range for a second row of pixels that are adjacent to the portion 14 of the image I3. The first row of pixels is arranged in a position corresponding to the zero pitch angle of the aircraft AC.

Figure 6:
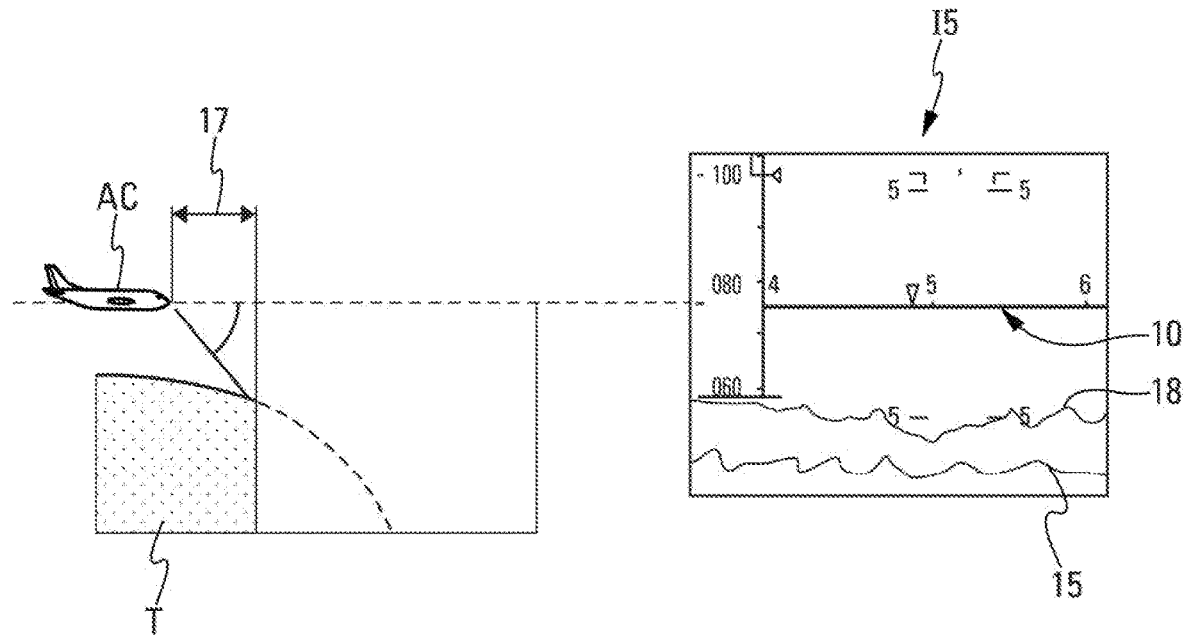
FIG. 6 shows a side view of an aircraft, the visibility of the SVS of which is limited, and a display comprising the first and the second images in superposition.

In addition to the curvature of the Earth T, it may be advantageous to take the limitation of the field of view 21 (FIG. 13) due to the SVS into account as well. FIG. 6 shows an aircraft AC flying over terrain and the image I5 that is liable to be displayed in a display system for this aircraft AC. Because of the limitation of the field of view 21 due to the SVS, the horizon 18 of the topography 15 is shifted downwards. The indicative element 12 is therefore liable to be exposed, since the displayed topography of the terrain 15 is too low to hide to the indicative element 12, even though there is no fault.

The following three embodiments provide solutions for dealing with the curvature of the Earth T and with the limitation of the field of view 21 of the SVS.

Figure 9:
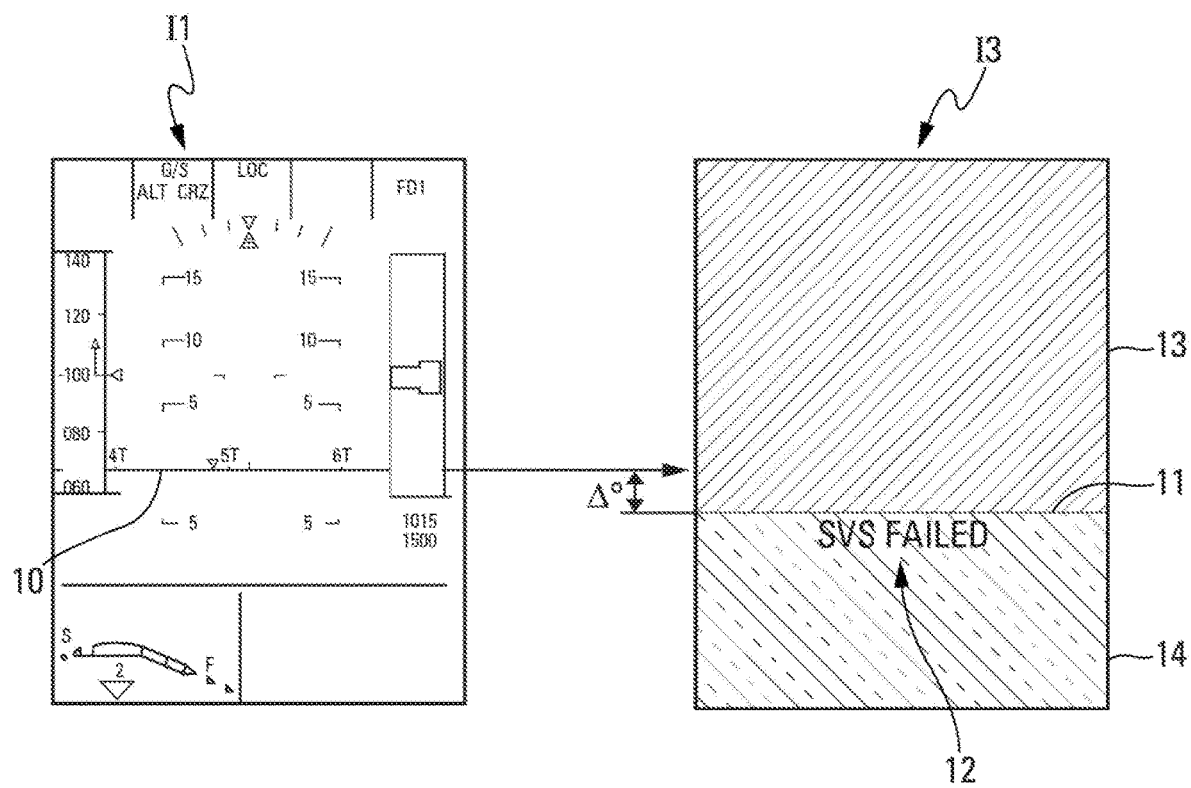
FIG. 9 shows, on the left, a first image showing symbology and, on the right, a third image according to another embodiment.

According to a fifth embodiment (FIG. 9), the separating line 11 is arranged at a pitch angle $\Delta^0$, with respect to a zero pitch angle position of the aircraft AC, that is equal to the difference between the zero pitch angle of the aircraft AC and a horizon line. This horizon line is determined on the basis of a predetermined distance 17 defined by the maximum field of view 21 of the topography of the terrain 15 depicted in the image I2. This pitch angle $\Delta^0$ is determined when the aircraft AC is flown at a maximum altitude. The predetermined distance 17 corresponds to the maximum distance of forward visibility from the aircraft AC limited by the field of view 21 due to the SVS.

In this embodiment, the indicative element 12 may be "fixed" below the separating line 11. For example, the indicative element 12 may be placed at a distance of between one and five pixels away from the separating line 11.

For example, the following equation allows the pitch angle $\Delta^0$ to be obtained according to the altitude of the aircraft AC while taking the curvature of the Earth T and the limitation of the field of view 21 into account:

$$\Delta^0(Altitude_{feet}, SVSrange_{NM}) =$$

$$\begin{cases} \text{Arctan}\left(\dfrac{A \times Altitude_{feet}}{SVSrange_{NM} \times B}\right), & Altitude_{feet} \in \left]0; \left(\dfrac{SVSrange_{NM}}{C}\right)^2\right] \\ \text{Arctan}\left(\dfrac{\sqrt{Altitude_{feet}}}{C \times B}\right), & Altitude_{feet} \in \left]\left(\dfrac{SVSrange_{NM}}{C}\right)^2; +\infty\right[ \end{cases}$$

where:
Altitude$_{feet}$ is the altitude of the aircraft AC in feet (1 foot is approximately equal to 0.305 m);
SVSrange$_{NM}$ is the predetermined distance 17 in nautical miles;
A, B and C are constants.

Nonlimitingly, the constant A is equal to 0.3048, the constant B is equal to 1852 and the constant C is equal to 1.23.

The equation therefore corresponds to a piecewise-defined function. For an altitude Altitude$_{feet}$ that is higher than a maximum predetermined altitude $$\left(\dfrac{SVSrange_{NM}}{C}\right)^2,$$

the pitch angle $\Delta^0$ is dependent on the altitude Altitude$_{feet}$ of the aircraft AC and on the predetermined distance 17. For an altitude that is lower than the maximum predetermined altitude $$\left(\dfrac{SVSrange_{NM}}{C}\right)^2,$$

the pitch angle $\Delta^0$ is dependent on the altitude Altitude$_{feet}$ of the aircraft AC only.

Thus, if it is assumed that the maximum altitude of the aircraft AC is equal to 50 000 feet (approximately 15 240 m) and that the predetermined distance 17 is equal to 50 NM (approximately 92.6 km), the pitch angle $\Delta^0$ is equal to 9.35°. The separating line 11 is positioned at a pitch angle $\Delta^0$ of 9.35° with respect to a zero pitch angle.

According to a sixth embodiment (FIG. 9), the separating line is arranged at a pitch angle $\Delta_0$, with respect to a zero pitch position of the aircraft AC, which is dependent on the altitude of the aircraft AC and on the predetermined distance 17.

In this embodiment, the position of the separating line 11 is dynamic and changes with the altitude of the aircraft AC. The equation for determining the position of the separating line may be the same as that described in the fifth embodiment in which the altitude Altitude$_{feet}$ of the aircraft AC is variable. Other equations may be used. The indicative element 12 may be "fixed" below the separating line 11. For example, the indicative element 12 may be placed at a distance of between one and five pixels away from the separating line 11.

Figure 11:
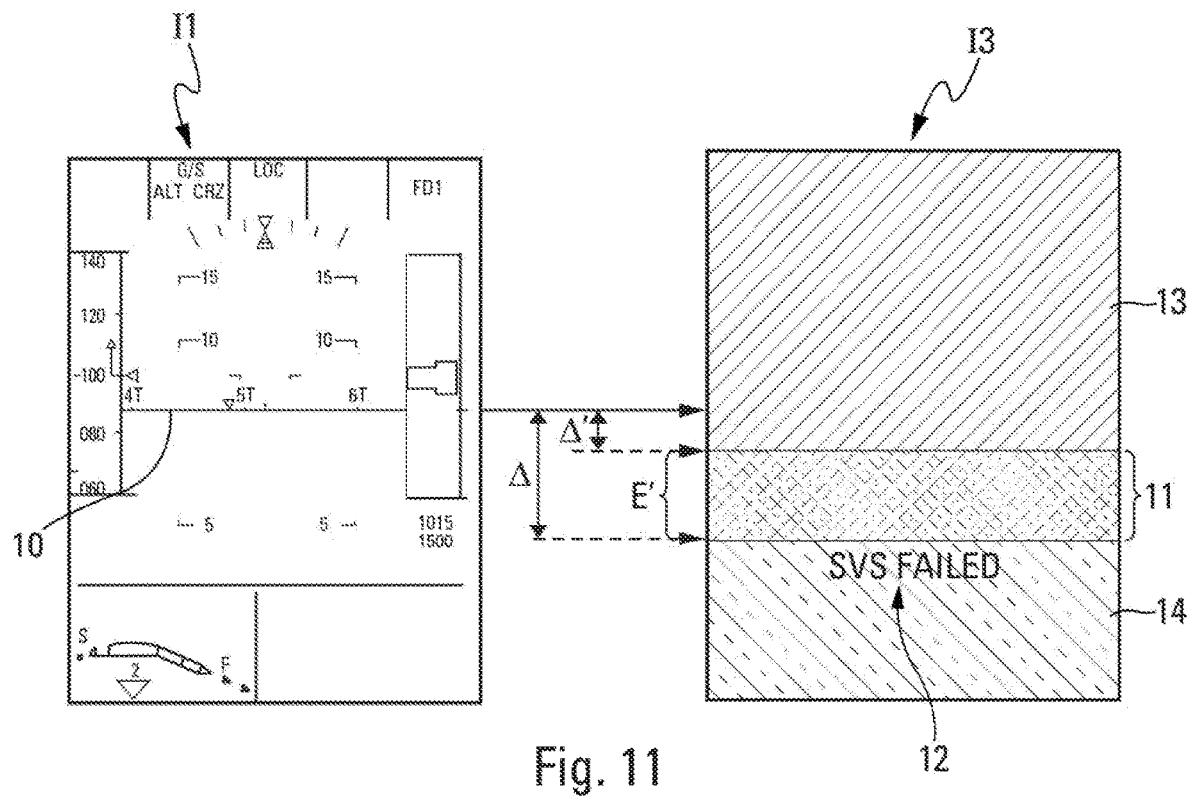
FIG. 11 shows, on the left, a first image showing symbology and, on the right, a third image according to another embodiment.

According to a seventh embodiment (FIG. 11), the thickness E' of the separating line 11 is equal to a pitch angle defined by the difference between a natural horizon line and a horizon line that is dependent on the predetermined distance 17. The natural horizon line corresponds to a horizon line without limitation of the field of view. The separating line 11 includes pixels having a value that is representative of a third colour range. The separating line 11 is arranged at a pitch angle Δ', with respect to a zero pitch position of the aircraft AC, that is equal to the difference between the zero pitch angle and the natural horizon line.

In a first variant, the position of the horizon line, which is dependent on the predetermined distance 17, is determined on the basis of a maximum distance defined by a maximum field of view of the topography of the terrain depicted in the second image, when the aircraft AC is flown at a maximum altitude. Thus, the position of the horizon line, which is dependent on the predetermined distance 17, may be determined using the same equation as that described in the fifth embodiment in which the altitude Altitude$_{feet}$ corresponds to the maximum altitude of the aircraft AC.

In a second variant, the position of the horizon line, which is dependent on the predetermined distance 17, is determined on the basis of a maximum distance defined by a maximum field of view of the topography of the terrain depicted in the second image, dependent on the current altitude of the aircraft AC. Thus, the position of the horizon line may be determined using the same equation as that described in the fifth embodiment in which the altitude Altitude$_{feet}$ is variable.

The pitch angle Δ' is dependent on the altitude of the aircraft AC and may have the following function:

$$\Delta'(Altitude_{feet}) = \arctan\left(\frac{\sqrt{Altitude_{feet}}}{1.23 \times 1852}\right).$$

Figure 7:
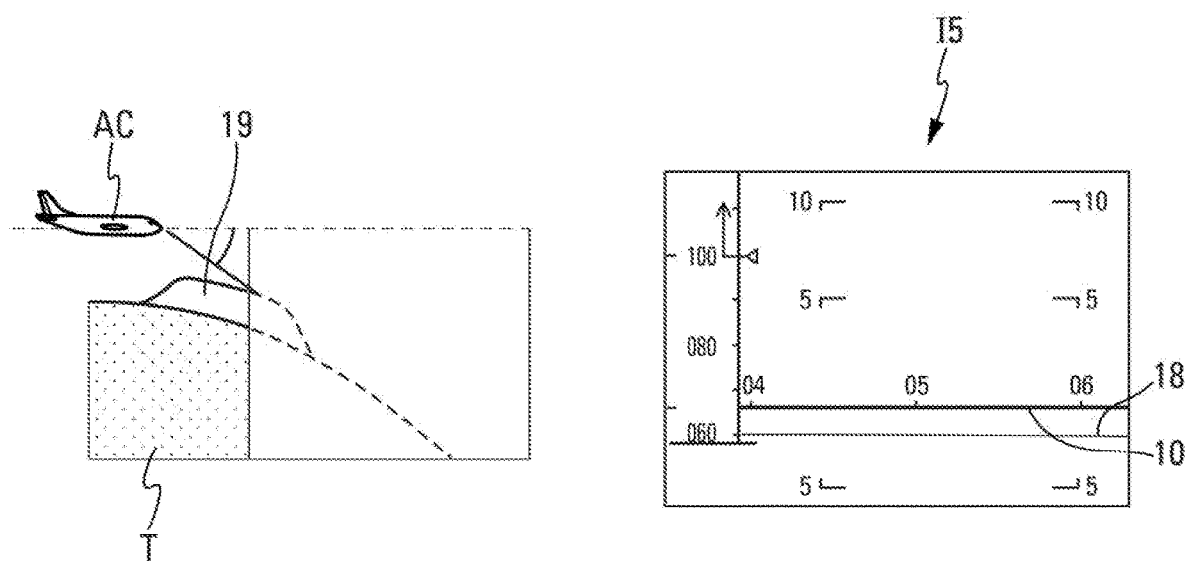
FIG. 7 shows a side view of an aircraft, the visibility of the SVS of which is limited, flying over terrain exhibiting a non-zero altitude, and a display comprising the first and the second images in superposition.

In this embodiment, the indicative element 12 may be "fixed" below the separating line 11. For example, the indicative element 12 may be arranged at a distance of between one and five pixels away from the separating line 11. The embodiments described above determine pitch angles Δ° and A for overflown terrain (or in other words, terrain around the aircraft AC) having a zero altitude. The following embodiments determine the pitch angle Δ° while taking the altitude of the terrain around the aircraft AC into account. FIG. 7 shows an aircraft AC flying over terrain and the image I5 that is liable to be displayed in a display system for this aircraft AC. In this FIG. 7, the terrain around the aircraft AC exhibits an elevation 19 resulting in the altitude of the terrain around the aircraft AC not being zero. In the case of FIG. 7, the horizon line, which is dependent on the predetermined distance 17, is raised with respect to the separating line 11 because the embodiments determining the position of the separating line 11 assume that the altitude of the terrain around the aircraft AC is zero.

The following embodiments provide solutions for dealing with the curvature of the Earth T and with the limitation of the field of view 21 of the SVS while taking the altitude of the terrain around the aircraft AC into account.

According to an eighth embodiment, the separating line 11 is arranged at a pitch angle Δ°, with respect to a zero pitch position of the aircraft AC, that is dependent on the altitude of the aircraft Zaircraft$_{feet}$ less an altitude of the terrain overflown Zterrain$_{feet}$ by the aircraft AC and on the predetermined distance 17.

For example, the following equation allows the pitch angle Δ° to be obtained according to the altitude of the aircraft AC while taking the curvature of the Earth T, the limitation of the field of view 21 and the altitude of the terrain into account:

$$\Delta^0(Zaircraft_{feet}, Zterrain_{feet}, SVSrange_{NM}) = \quad (1)$$

$$\begin{cases} \arctan\left(\dfrac{A \times (Zaircraft_{feet} - Zterrain_{feet})}{SVSrange_{NM} \times B}\right) & (2) \\ \arctan\left(\dfrac{Zaircraft_{feet} - Zterrain_{feet}}{C \times B}\right) \end{cases}$$

where:

Zaircraft$_{feet}$ is the current altitude of the aircraft AC in feet;

Zterrain$_{feet}$ is the altitude of the terrain around the aircraft AC in feet; and SVSrange$_{NM}$ is the predetermined distance 17 defined by the maximum field of view 21 in nautical miles, A, B and C are constants.

Equation (1) is applied when:

$$SVSrange_{NM} \in ]0; 1.23\sqrt{Zaircraft_{feet} - Zterrain_{feet}}].$$

Equation (2) is applied when:

$$SVSrange_{NM} \in ]1.23\sqrt{Zaircraft_{feet} - Zterrain_{feet}}; +\infty[.$$

Nonlimitingly, the constant A is equal to 0.3048, the constant B is equal to 1852 and the constant C is equal to 1.23.

Preferably, this embodiment is implemented when the aircraft AC is close to the ground.

Consequently, according to one variant embodiment, if the aircraft finds itself in one of the following situations:
  on final approach in a landing phase;
  in a takeoff phase;
  in a go-around phase;
then the altitude of the overflown terrain is equal to a current altitude of the overflown terrain in one of the preceding situations. For example, the altitude of the terrain is set at the altitude of a runway at which the aircraft AC lands, takes off or performs a go-around.

Thus, returning to the preceding equation, the pitch angle Δ° of the separating line 11 is determined by replacing the altitude of the terrain around the aircraft AC Zterrain$_{feet}$ with the altitude of the runway.

When the aircraft AC is not in one of the above situations, the desensitization device is implemented according to the preceding embodiments in which the altitude of the overflown terrain is assumed to be zero.

The situation in which the aircraft AC finds itself may be determined from the altitude of the aircraft AC measured by an altimeter, from data that are representative of the flight phase of the aircraft AC provided by a system external to the device or a distance between the current position of the aircraft AC and a point of departure or of arrival of the aircraft AC.

According to one variant of the eighth embodiment, the thickness E' of the separating line 11 is equal to a pitch angle defined by the difference between a natural horizon line and a horizon line that is dependent on the predetermined distance 17. The thickness E' is determined in the same way as the thickness E' of the seventh embodiment.

Figure 13:
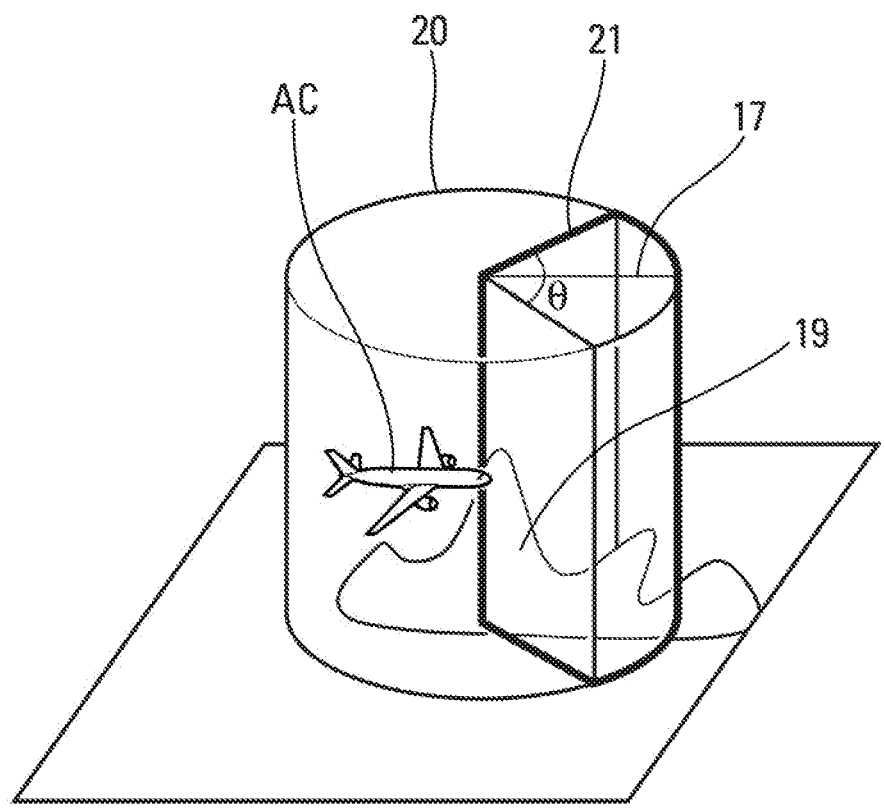
FIG. 13 shows a perspective view of an aircraft flying over terrain exhibiting a non-zero altitude and a cylinder segment that is representative of the field of view of the SVS.

According to a ninth embodiment, the altitude of overflown terrain Zterrain$_{feet}$ is equal to a minimum altitude of the terrain overflown by the aircraft AC within a segment 21 of a cylinder 20 (FIG. 13). The cylinder 20 is centred on the aircraft AC. The radius of the segment 21 of cylinder 20 is equal to the predetermined distance 17 and the aperture angle θ thereof corresponds to the maximum field of view 21.

Thus, returning to the preceding equation, the pitch angle $\Delta^0$ of the separating line 11 is determined by replacing the altitude of the terrain around the aircraft AC $Zterrain_{feet}$ with the minimum altitude of the terrain overflown by the aircraft AC within the segment 21 of cylinder 20.

According to one variant of the ninth embodiment, the thickness E' of the separating line 11 is equal to a pitch angle defined by the difference between a natural horizon line and a horizon line that is dependent on the predetermined distance. The thickness E' is determined in the same way as the thickness E' of the seventh embodiment.

According to a tenth embodiment, the pitch angle $\Delta^0$ of the separating line 11 is determined directly from an apparent angle of the terrain visible from the position of the aircraft AC.

Figure 14:
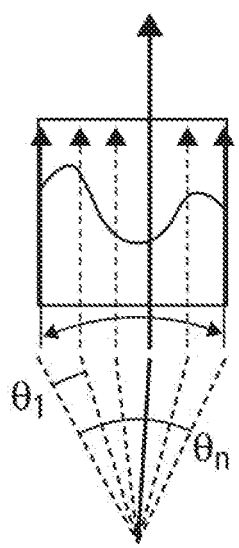
FIG. 14 shows a sectional view of the cylinder segment divided into subsegments.

For this, the segment 21 of cylinder 20 is divided into n discrete sections according to the angles $\theta_1, \ldots, \theta_n$ (FIG. 14).

Figure 15:
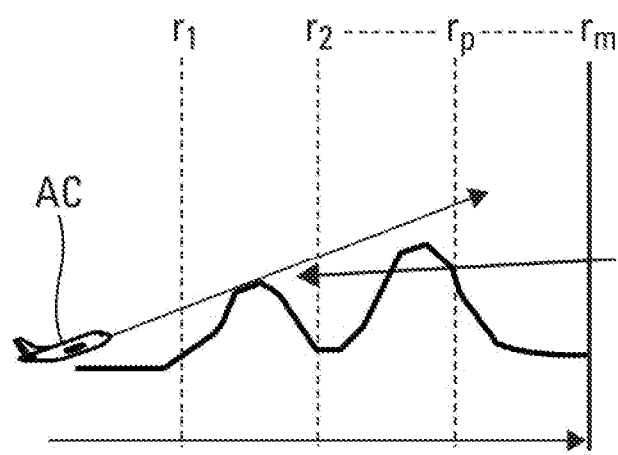
FIG. 15 shows a side view of an aircraft flying over terrain of non-zero altitude and the points along the predetermined distance of the maximum field of view for which the apparent angles of terrain have been determined.
Figure 16:
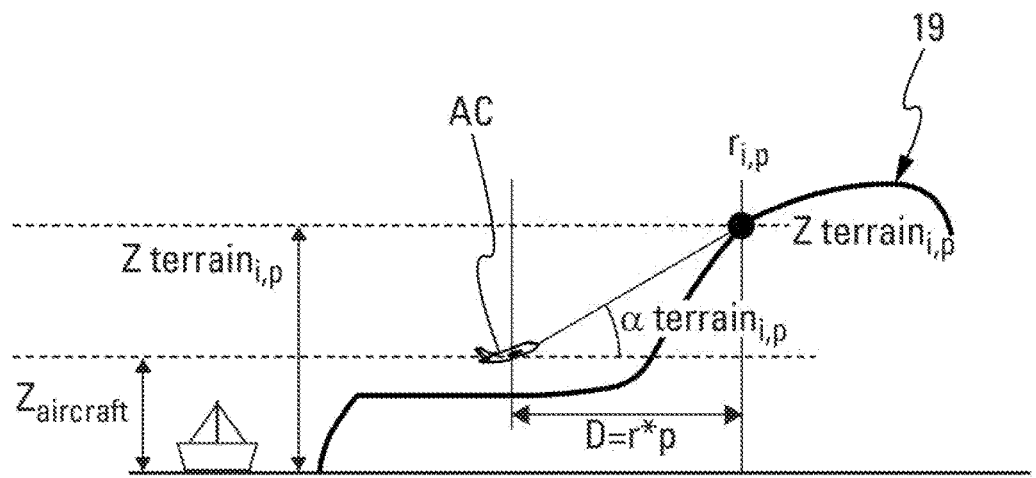
FIG. 16 shows a perspective view of an aircraft flying over terrain of non-zero altitude for the purpose of determining an apparent angle of terrain for a cylinder subsegment and a point.

For each of the discrete sections $\theta_1, \ldots, \theta_n$, the largest apparent angle of terrain $\alpha terrain_i$ with the horizon is determined. To obtain this angle $\alpha terrain_i$ for each of the discrete sections $\theta_1, \ldots, \theta_i, \ldots, \theta_n$, the altitude of the terrain may be determined at several points $r_1, r_2, \ldots r_p, \ldots r_m$ along the discrete section (FIGS. 15 and 16). The distance between the aircraft AC and the point $r_m$ corresponds to the predetermined distance 17. An angle $\alpha terrain_{i,p}$ is then obtained.

FIG. 16 shows the angle $\alpha terrain_{i,p}$ being determined for a discrete section $\theta_i$ and a point $r_p$.

Thus, the angle $\alpha terrain_{i,p}$ is determined using the following equation:

$$\alpha terrain_{i,p} = \operatorname{Arctan}\left(\frac{Zterrain_{i,p} - Zaircraft}{r_p}\right).$$

For any discrete section $\theta_1$, the angle $\alpha terrain_i$ is determined using the following equation:

$$\alpha terrain_i = \max_{p=1}^{m}[\alpha terrain_{i,p}].$$

Figure 17:
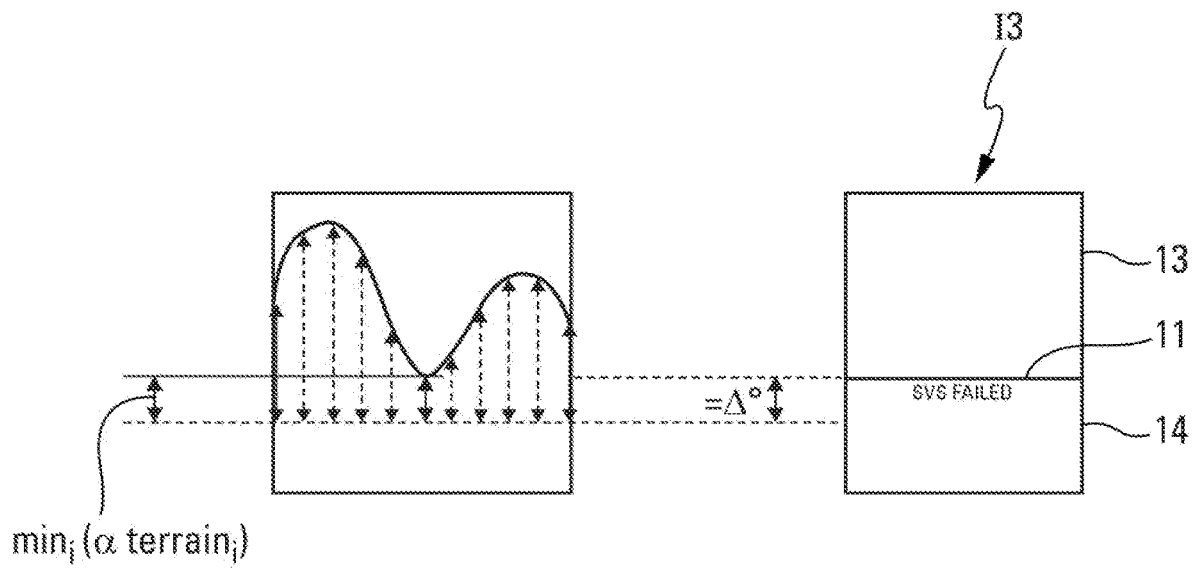
FIG. 17 shows, on the left, a first image showing the apparent angles of terrain for a subsegment and, on the right, a third image generated on the basis of the minimum apparent angle of terrain.

The pitch angle $\Delta^0$ positioning the separating line 11 then corresponds to the minimum angle $\alpha terrain_i$ (FIG. 17):

$$\Delta^0 = \alpha terrain = \min_{i=1}^{n}[\alpha terrain_i].$$

For the first embodiment, the indicative element 12 is arranged at a distance that is representative of a pitch angle $\Delta^0$ with respect to the separating line 11 corresponding to an angle that is defined by the difference between the zero pitch angle of the aircraft AC and a natural horizon line when the aircraft AC is flown at a maximum altitude. For the other embodiments, the indicative element 12 may be "fixed" below the separating line 11 according to a first configuration.

According to a second configuration (FIGS. 18 and 19), the indicative element 12 may be arranged at a distance corresponding to a pitch angle that is smaller than or equal to a pitch angle corresponding to the lowest point 23 of at least one ridge line 24 seen in a display field of view 22, 27. Each of the ridge lines 24 corresponds to a natural horizon line for various typical points on an approach trajectory, on a go-around trajectory or on a takeoff trajectory of the aircraft AC. Each natural horizon line corresponds to a horizon 18 in the image I2 for each of the various typical points. The ridge lines 24 are determined for specific airport runways.

Nonlimitingly, the typical points are determined on the basis of at least one of the following parameters:
the selected approach runway;
the current runway at which the aircraft AC is likely to land;
the altitude of the aircraft AC;
the altitude of the threshold of the selected runway;
lateral and vertical approach deviations;
the vertical trajectory approach angle;
the minimum decision altitude;
the maximum takeoff rate of climb.

Figure 18:
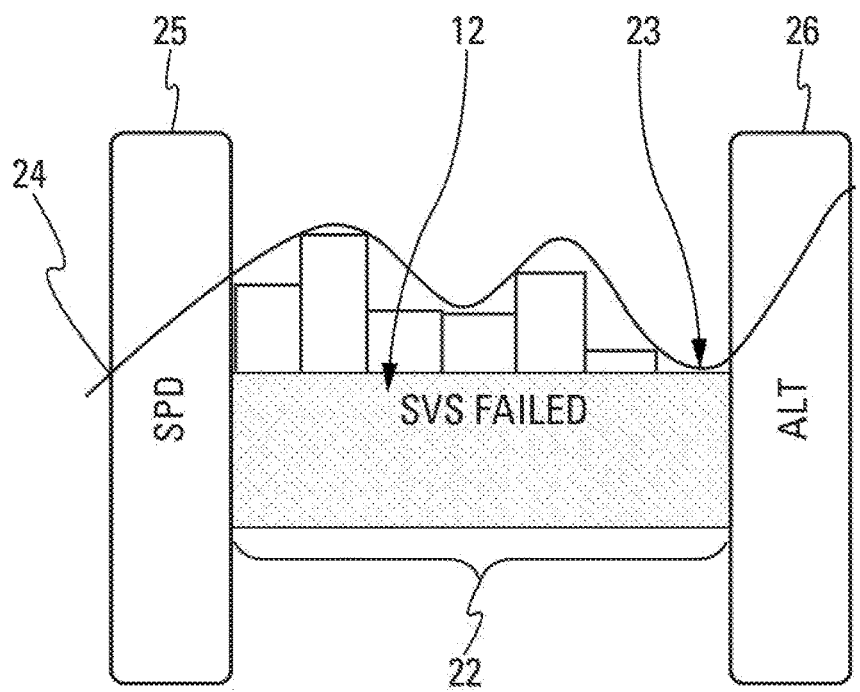
FIG. 18 shows the positioning of an indicative element according to one variant.

The display field of view 22 may correspond to the total field of view that is liable to be displayed by a primary flight display PFD (FIG. 18). For example, the display field of view is located between a speed scale 25 (SPD) indicating a speed displayed in the image I1 and an altitude scale 26 (ALT) indicating an altitude displayed in the image I1.

Figure 19:
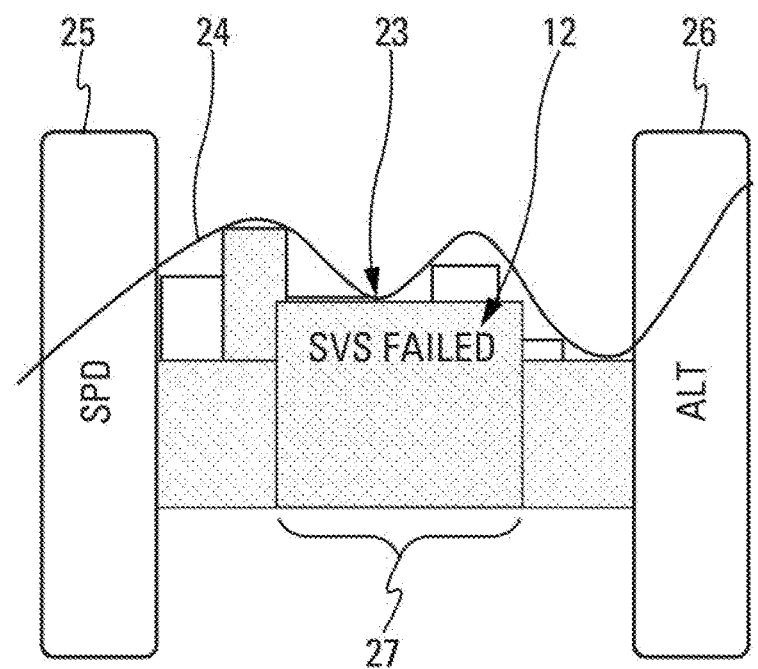
FIG. 19 shows the positioning of an indicative element according to another variant.

The display field of view 27 may also correspond to a portion of the total field of view that is liable to be displayed by the primary flight display PFD (FIG. 19).

According to a first variant, the ridge lines 24 are predetermined and stored in a memory database of the aircraft AC. Advantageously, the ridge lines 24 are discrete in form so as to minimize the memory required to store them.

According to a second embodiment, the ridge lines 24 are determined on each flight of the aircraft AC in order to be stored in the memory database of the aircraft AC or to update the one or more ridge lines 24 that are already stored in the memory database.

The invention also relates to a method for desensitizing an aircraft AC display system, configured to display a synthetic representation of terrain, to faults.

Figure 1:
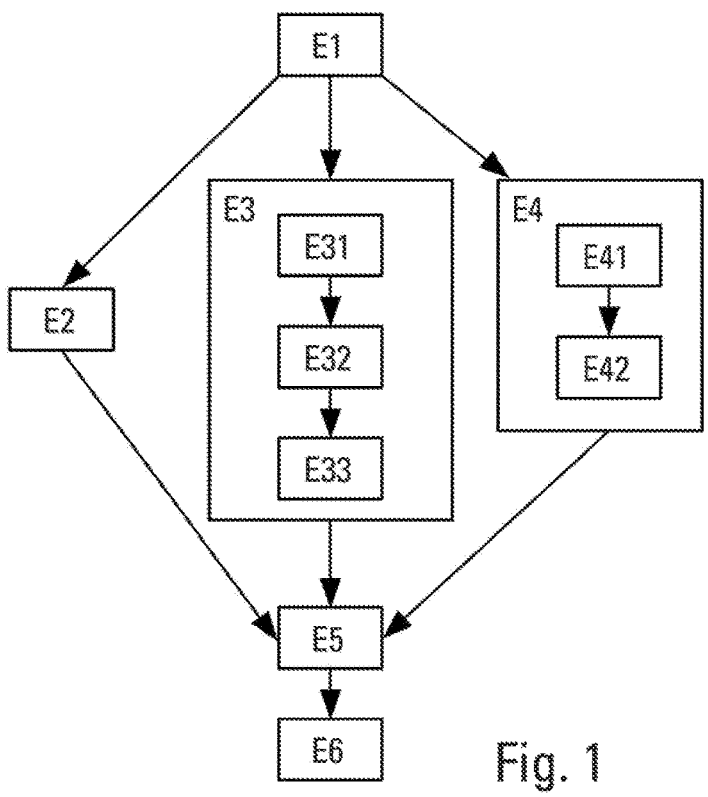
FIG. 1 schematically shows one embodiment of the fault desensitization device.

The desensitization method (FIG. 1) comprises the following steps:

an acquisition step E1, implemented by the acquisition module 3, consisting in acquiring environment data and current flight parameters of the aircraft AC, including at least an attitude, an altitude, a three-dimensional position and a heading;

a generation step E2, implemented by the generation module 4, consisting in generating the image I1 depicting flight symbology comprising at least one reference zero pitch line, the image I1 indicating a pitch angle with respect to a zero pitch angle of the aircraft AC, the reference zero pitch line being representative of the zero pitch angle of the aircraft AC, the image I1 being generated on the basis of at least the attitude;

a generation step E3, implemented by the generation module 5, consisting in generating the image I2 depicting topography of terrain overflown by the aircraft AC on the basis of at least the attitude, the heading, the three-dimensional position and the environment data;

a generation step E4, implemented by the generation module 6, consisting in generating the image I3 comprising at least two portions separated by a separating line that is determined on the basis of the attitude of the aircraft AC, a first portion 13 including pixels having a value that is representative of a first colour range, a second portion 14 including pixels having a value that is representative of a second colour range;

a generation step E5, implemented by the generation module 7, consisting in generating the image I4 by superposing the image I1, the image I2 and the image I3 in that order, the image I1 being placed in the foreground;

a transmission step E6, implemented by the transmission module 8, consisting in transmitting, to the user device 9, a signal that is representative of the image I4.

The generation step E3 may comprise the following substeps:

a determination substep E31, implemented by the determination submodule 51, consisting in determining the topography of the terrain overflown by the aircraft AC on the basis of at least the attitude, the three-dimensional position, the heading and the environment data;

an attribution substep E32, implemented by the attribution submodule 52, consisting in attributing at least one pixel value to the first set of pixels forming part of the image I2, the one or more pixel values being representative of the topography of the terrain overflown by the aircraft AC;

an attribution substep E33, implemented by the attribution submodule 53, consisting in attributing a value that is representative of a transparent pixel to the second set of pixels forming part of the image I2, the second set of pixels corresponding to a set from the image I2, the pixels of which do not belong to the first set of pixels.

The generation step E4 comprises the following substeps:

a determination substep E41, implemented by the determination submodule 61, consisting in determining a position of the separating line on the basis of the reference zero pitch line, the separating line being parallel to the reference zero pitch line 10, the portion 14 of the image I3 being at least partly in correspondence with the topography of the terrain 15 overflown by the aircraft AC represented in the image I2 when the image I1, the image I2 and the image I3 are superposed in the generation step E5;

an addition substep E42, implemented by the addition module 62, consisting in adding the indicative element 12 that is indicative of an error to the portion 14 of the image I3.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for desensitizing an aircraft display system, configured to display a synthetic representation of terrain, to faults, the method comprising, using one or more processors, an acquisition step, implemented by an acquisition module comprising the one or more processors, including acquiring environment data and current flight parameters of the aircraft, including at least an attitude, an altitude, a three-dimensional position and a heading;

a first generation step, implemented by a first generation module comprising the one or more processors, including generating a first image depicting flight symbology comprising at least one reference zero pitch line, the first image indicating a pitch angle with respect to a zero pitch angle of the aircraft, the reference zero pitch line being representative of the zero pitch angle of the aircraft, the first image being generated on the basis of at least the attitude;

a second generation step, implemented by a second generation module comprising the one or more processors, including generating a second image depicting topography of terrain overflown by the aircraft on the basis of at least the attitude, the heading, the three-dimensional position and the environment data;

a third generation step, implemented by a third generation module comprising the one or more processors, including generating a third image comprising at least two portions separated by a separating line that is determined on the basis of the attitude of the aircraft, a first portion including pixels having a value that is representative of a first colour range, a second portion including pixels having a value that is representative of a second colour range;

a fourth generation step, implemented by a fourth generation module comprising the one or more processors, including generating a fourth image by superposing the first image, the second image and the third image in that order, the first image being placed in the foreground such that, when the topography of the overflown terrain shown in the second image is shifted downwards because of a fault, the second portion of the third image is visible in the fourth image, thus highlighting said fault; and a transmission step, implemented by a transmission module comprising the one or more processors, including transmitting, to a user device, a signal that is representative of the fourth image.

2. The method according to claim 1, wherein the second generation step comprises:

a first determination substep, implemented by a first determination submodule comprising the one or more processors, including determining the topography of the terrain overflown by the aircraft on the basis of at least the attitude, the three-dimensional position, the heading and the environment data;

a first attribution substep, implemented by a first attribution submodule comprising the one or more processors, including attributing at least one pixel value to a first set of pixels forming part of the second image, the one or more pixel values being representative of the topography of the terrain overflown by the aircraft; and a second attribution substep, implemented by a second attribution submodule comprising the one or more processors, including attributing a value that is representative of a transparent pixel to a second set of pixels forming part of the second image, the second set of pixels corresponding to a set of the second image, the pixels of which do not belong to the first set of pixels.

3. The method according to claim 1, wherein the third generation step comprises:

a second determination substep, implemented by a second determination submodule comprising the one or more processors, including determining a position of the separating line on the basis of the reference zero pitch line, the separating line being parallel to the reference zero pitch line, the second portion of the third image being at least partly in correspondence with the topography of the terrain overflown by the aircraft represented in the second image when the first image, the second image and the third image are superposed in the fourth generation step; and an addition substep, implemented by an addition module comprising the one or more processors, including adding an indicative element that is indicative of an error to the second portion of the third image so as to signal said fault explicitly, the indicative element being visible in the fourth image when the topography of the overflown terrain shown in the second image is shifted downwards because of the fault.

4. The method according to claim 3, wherein the separating line is arranged in a position corresponding to a zero pitch angle of the aircraft; and wherein the indicative element is arranged at a distance corresponding to a pitch angle with respect to the separating line corresponding to an angle that is defined by the difference between the zero pitch angle of the aircraft and a natural horizon line when the aircraft is flown at a maximum altitude.

5. The method according to claim 3, wherein the separating line is arranged at a pitch angle, with respect to a zero pitch angle position of the aircraft, that is equal to the difference between the zero pitch angle of the aircraft and a natural horizon line when the aircraft is flown at a maximum altitude.

6. The method according to claim 3, wherein the separating line is arranged at a pitch angle, with respect to a zero pitch position of the aircraft, which is dependent on the altitude of the aircraft.

7. The method according to claim 3, wherein the thickness of the separating line is equal to a pitch angle that is defined by the difference between a zero pitch angle of the aircraft and a natural horizon line when the aircraft is flown at a maximum altitude, the separating line comprising pixels exhibiting a gradient of values along the thickness between a value equal to a value that is representative of the first colour range for a first row of pixels that are adjacent to the first portion of the third image and a value equal to a value that is representative of the second colour range for a second row of pixels that are adjacent to the second portion of the third image, the first row of pixels being arranged in a position corresponding to the zero pitch angle of the aircraft.

8. The method according to claim 3, wherein the separating line is arranged at a pitch angle, with respect to a zero pitch angle position of the aircraft, that is equal to the difference between the zero pitch angle of the aircraft and a horizon line, the horizon line being determined on the basis of a predetermined distance defined by a maximum field of view of the topography of the terrain represented in the second image, when the aircraft is flown at a maximum altitude.

9. The method according to claim 3, wherein the separating line is arranged at a pitch angle, with respect to a zero pitch position of the aircraft, that is dependent on the altitude of the aircraft and on a predetermined distance defined by a maximum field of view of the topography of the terrain represented in the second image.

10. The method according to claim 3, wherein the thickness of the separating line is equal to a pitch angle that is defined by the difference between a natural horizon line and a horizon line that is dependent on a predetermined distance defined by a maximum field of view of the topography of the terrain represented in the second image, the separating line including pixels exhibiting a value that is representative of a third colour range, the separating line being arranged at a pitch angle, with respect to a zero pitch position of the aircraft, that is equal to the difference between the zero pitch angle and the natural horizon line.

11. The method according to claim 3, wherein the separating line is arranged at a pitch angle, with respect to a zero pitch position of the aircraft, that is dependent on the altitude of the aircraft less an altitude of the terrain overflown by the aircraft and on a predetermined distance defined by a maximum field of view of the topography of the terrain represented in the second image.

12. The method according to claim 11, wherein, if the aircraft finds itself in one of the following situations:
on final approach in a landing phase;
in a takeoff phase;
in a go-around phase;
then the altitude of the overflown terrain is equal to a current altitude of the overflown terrain in one of the preceding situations,
otherwise the altitude of the overflown terrain is assumed to be zero.

13. The method according to claim 11, wherein the altitude of overflown terrain is equal to a minimum altitude of the terrain overflown by the aircraft within a cylinder segment, the cylinder being centred on the aircraft, the radius of the cylinder segment being equal to the predetermined distance and having an aperture angle of the maximum field of view.

14. A device for desensitizing an aircraft display system, configured to display a synthetic representation of terrain, to faults, the device comprising:
one or more processors;
an acquisition module comprising the one or more processors and configured to acquire environment data and current flight parameters of the aircraft, including at least an attitude, an altitude, a three-dimensional position and a heading;
a first generation module comprising the one or more processors and configured to generate a first image depicting flight symbology comprising at least one reference zero pitch line, the first image indicating a pitch angle with respect to a zero pitch angle of the aircraft, the reference zero pitch line being representative of the zero pitch angle of the aircraft, the first image being generated on the basis of at least the attitude;
a second generation module comprising the one or more processors and configured to generate a second image depicting topography of terrain overflown by the aircraft on the basis of at least the attitude, the heading, the three-dimensional position and the environment data;
a third generation module comprising the one or more processors and configured to generate a third image comprising at least two portions separated by a separating line that is determined on the basis of the attitude of the aircraft, a first portion including pixels having a value that is representative of a first colour range, a second portion including pixels having a value that is representative of a second colour range;
a fourth generation module comprising the one or more processors and configured to generate a fourth image by superposing the first image, the second image and the third image in that order, the first image being placed in the foreground such that, when the topography of the overflown terrain shown in the second image is shifted downwards because of a fault, the second portion of the third image is visible in the fourth image, thus highlighting said fault; and
a transmission module comprising the one or more processors and configured to transmit, to a user device, a signal that is representative of the fourth image.

15. An aircraft comprising a fault a device for desensitizing an aircraft display system, configured to display a synthetic representation of terrain, to faults, the device comprising:

one or more processors;

an acquisition module comprising the one or more processors and configured to acquire environment data and current flight parameters of the aircraft, including at least an attitude, an altitude, a three-dimensional position and a heading;

a first generation module comprising the one or more processors and configured to generate a first image depicting flight symbology comprising at least one reference zero pitch line, the first image indicating a pitch angle with respect to a zero pitch angle of the aircraft, the reference zero pitch line being representative of the zero pitch angle of the aircraft, the first image being generated on the basis of at least the attitude;

a second generation module comprising the one or more processors and configured to generate a second image depicting topography of terrain overflown by the aircraft on the basis of at least the attitude, the heading, the three-dimensional position and the environment data;

a third generation module comprising the one or more processors and configured to generate a third image comprising at least two portions separated by a separating line that is determined on the basis of the attitude of the aircraft, a first portion including pixels having a value that is representative of a first colour range, a second portion including pixels having a value that is representative of a second colour range;

a fourth generation module comprising the one or more processors and configured to generate a fourth image by superposing the first image, the second image and the third image in that order, the first image being placed in the foreground such that, when the topography of the overflown terrain shown in the second image is shifted downwards because of a fault, the second portion of the third image is visible in the fourth image, thus highlighting said fault; and a transmission module comprising the one or more processors and configured to transmit, to a user device, a signal that is representative of the fourth image.

* * * * *